(12) United States Patent
Le et al.

(10) Patent No.: US 7,398,592 B2
(45) Date of Patent: Jul. 15, 2008

(54) MANUFACTURABLE CMP ASSISTED LIFTOFF PROCESS TO FABRICATE WRITE POLE FOR PERPENDICULAR RECORDING HEADS

(75) Inventors: Quang Le, San Jose, CA (US); Jui-Lung Li, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 448 days.

(21) Appl. No.: 11/093,962

(22) Filed: Mar. 29, 2005

(65) Prior Publication Data

US 2006/0225268 A1 Oct. 12, 2006

(51) Int. Cl.
  *G11B 5/127* (2006.01)
  *H04R 31/00* (2006.01)

(52) U.S. Cl. .............. 29/603.16; 29/603.13; 29/603.14; 29/603.15; 29/603.18; 205/119; 205/122; 360/122; 360/317; 360/319; 204/192.1; 204/192.34; 451/5; 451/41

(58) Field of Classification Search .............. 29/603.08, 29/603.12, 603.13–603.16, 603.1; 205/119, 205/122; 360/126, 317; 427/127, 128; 204/192.1, 204/192.34; 216/62, 66, 67
See application file for complete search history.

(56) References Cited

U.S. PATENT DOCUMENTS

| 6,757,143 | B2 | 6/2004 | Tunayama et al. |
| 7,255,784 | B2 * | 8/2007 | Sato et al. ................... 205/644 |
| 2002/0027751 | A1 | 3/2002 | Shimazawa et al. |
| 2003/0235989 | A1 | 12/2003 | Jayashanker |
| 2004/0071017 | A1 | 4/2004 | Seigler et al. |
| 2004/0106295 | A1 | 6/2004 | Cyrille et al. |
| 2006/0101636 | A1 * | 5/2006 | Cyrille et al. ............ 29/603.15 |

* cited by examiner

*Primary Examiner*—Paul D Kim
(74) *Attorney, Agent, or Firm*—Robert O. Guillot; Intellectual Property Law Offices (57) ABSTRACT

This invention describes a manufacturable method, including a CMP liftoff process, for removing masking materials after ion milling for fabricating the write pole of a magnetic head. Significant parameters for the CMP assisted liftoff process include the thickness of the remaining mask materials after the write pole ion milling for effective CMP assisted liftoff, the thickness of the dielectric fill material deposited to protect the write pole during the CMP liftoff step, and the type of CMP slurry, polishing pad and the polishing conditions that are required to yield satisfactory results.

18 Claims, 7 Drawing Sheets

MANUFACTURABLE CMP ASSISTED LIFTOFF PROCESS TO FABRICATE WRITE POLE FOR PERPENDICULAR RECORDING HEADS

BACKGROUND OF THE INVENTION

1. Field of the Invention

The present invention relates generally to magnetic heads that are utilized with thin film hard disk data storage devices, and more particularly to the design and fabrication of a write pole for a perpendicular magnetic head.

2. Description of the Prior Art

Hard disk drives generally include one or more rotatable data storage disks having a magnetic data storage layer formed thereon. Data in the form of small magnetized areas, termed magnetic data bits, are written onto the magnetic layers of the disks by a magnetic head that includes magnetic poles through which magnetic flux is caused to flow. Magnetic flux flowing from a pole tip portion of the magnetic poles in close proximity to the magnetic layer on the disk, causes the formation of the magnetic bits within the magnetic layer.

In recent years, perpendicular magnetic heads have received renewed interest in the effort to extend data areal storage density. The increased demand for higher areal storage density has correspondingly fueled the exploration of a robust process to form the write pole of the perpendicular magnetic head. Current exploratory fabrication methods use an ion milling process to fabricate the write pole, in which a photolithographical pattern is image-transferred by reactive ion etching (RIE) into a material with a low ion milling rate using a bi-layer or tri-layer hard mask scheme. The hard mask then functions as a transfer mask to pattern the write pole into a full-film magnetic material. Since patterning is by a physical process, one major complication in developing a robust write pole fabrication process is the difficulty in removing mask overburden materials and flattening the surface of the wafer without damaging the write pole. As the dimensions of the write pole shrink and the requirements on the retention of the write pole thickness, width and shape become more stringent, a major challenge is to develop a manufacturable process that overcomes the inherent within wafer non-uniformity that often accompanies the conventional CMP process.

SUMMARY OF THE INVENTION

This invention includes a manufacturable method, including a CMP liftoff process, for removing masking materials after ion milling for fabricating the write pole of a magnetic head. Significant parameters for the CMP assisted liftoff process include the thickness of the remaining mask materials after the write pole ion milling for effective CMP assisted liftoff, the thickness of the dielectric fill material deposited to protect the write pole during the CMP liftoff step, and the type of CMP slurry, polishing pad and the polishing conditions that are required to yield satisfactory results.

It is an advantage of the method for fabricating a magnetic pole of the present invention that a well shaped magnetic pole is more reliably formed within magnetic heads that are fabricated across the surface of a wafer substrate.

It is another advantage of the process of fabricating a magnetic pole of the present invention that magnetic poles having a straight trailing edge and sharp, well-defined corners are more reliably formed across the surface of a wafer substrate.

It is a further advantage of the method for fabricating a magnetic pole of the present invention that remaining portions of an ion milling mask are removed from the magnetic pole using a CMP liftoff step.

It is yet another advantage of the method for fabricating a magnetic pole of the present invention that a fill layer is deposited to protect the magnetic pole prior to a CMP liftoff step that removes remaining ion milling mask material from the magnetic pole.

It is yet a further advantage of the method for fabricating a magnetic pole of the present invention that a diamond-like-carbon (DLC) layer is deposited upon a fill layer to protect the fill layer and magnetic pole during a CMP liftoff step that removes remaining ion milling mask material from the magnetic pole.

These and other features and advantages of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

DETAILED DESCRIPTION OF THE PREFERRED EMBODIMENTS

Figure 1:
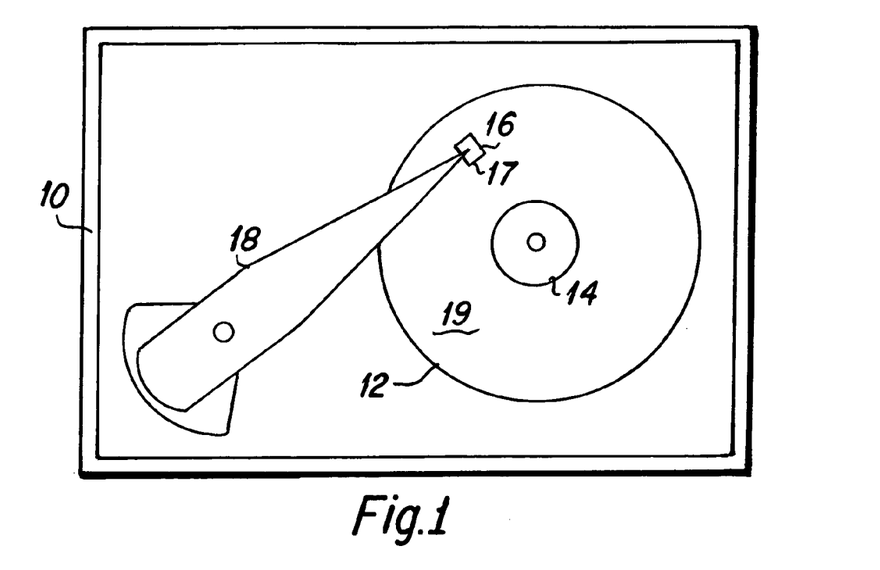
FIG. 1 is a top plan view of a hard disk drive including a magnetic head of the present invention.

The magnetic head of the present invention is utilized to read and write data to magnetic media, such as a hard disk in a hard disk drive. A simplified top plan view of a hard disk drive 10 is presented in FIG. 1, wherein at least one magnetic media hard disk 12 is rotatably mounted upon a spindle 14. A magnetic head 16 of the present invention is formed upon a slider 17 that is mounted upon an actuator arm 18 to fly above the surface 19 of each rotating hard disk 12, as is well known to those skilled in the art. A typical hard disk drive 10 may include a plurality of disks 12 that are rotatably mounted upon the spindle 14, and a plurality of actuator arms 18, each having at least one slider 17 with a magnetic head 16 that is mounted upon the distal end of the actuator arms 18. As is well known to those skilled in the art, when the hard disk drive 10 is operated, the hard disk 12 rotates upon the spindle 14 and the slider acts as an air bearing in flying above the surface of the rotating disk. The slider 17 includes a substrate base upon which various layers and structures that form the magnetic head are fabricated. Such heads are fabricated in large quantities upon a wafer substrate and subsequently sliced into discrete sliders 17 each having a magnetic head 16. The present invention relates to the wafer level fabrication of magnetic heads upon a wafer substrate.

Figure 2:
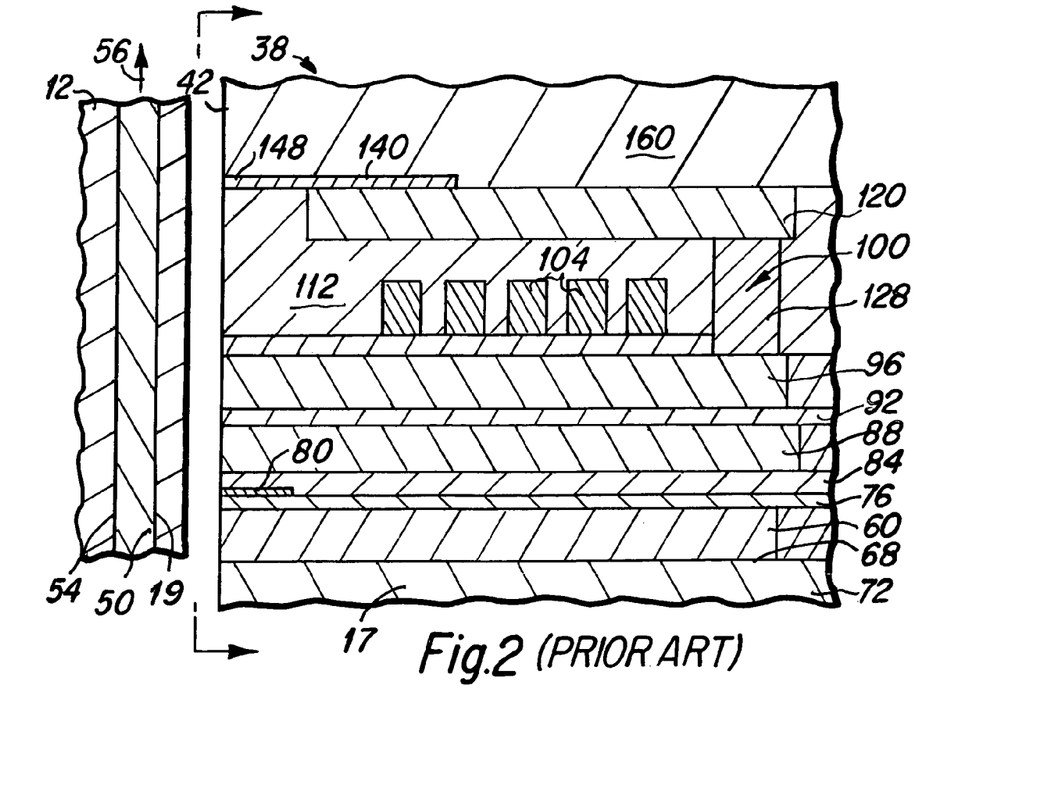
FIG. 2 is a side cross-sectional view of a typical prior art perpendicular magnetic head.

FIG. 2 is a side cross-sectional diagram of a typical prior art perpendicular magnetic head 38 which serves as a basis for the description of the improved perpendicular write head fabrication process of the present invention which follows. As depicted in FIG. 2, a slider 17 having an air bearing surface (ABS) 42 is shown with a magnetic head 38 in a data writing position above the surface 19 of a hard disk 12. The disk 12 typically includes a high coercivity magnetic layer 50 that is fabricated on top of a magnetically soft underlayer 54. In FIG. 2, the disk 12 is moving towards the top (arrow 56) relative to the stationary slider 17.

The perpendicular head 38 includes a first magnetic shield layer (S1) 60 that is formed upon the upper surface 68 of the slider substrate 72. A first insulation layer (G1) 76 is formed on the S1 shield 60 and a read head sensor element 80 is formed on the G1 layer 76. A second insulation layer (G2) 84 is formed on the sensor 80 and a second magnetic shield layer (S2) 88 is formed upon the G2 insulation layer 84. An electrical insulation layer 92 is then deposited upon the S2 shield 88, and a first magnetic pole (P1) 96 is fabricated upon the insulation layer 92. An induction coil structure 100 is fabricated upon the P1 pole 96, that includes induction coil turns 104 that are typically formed upon an electrical insulation layer 108 and within filling insulation 112. A second magnetic pole layer 120, typically termed a shaping layer 120, is fabricated on top of the induction coil structure 100. A magnetic back gap piece 128 joins the back portions of the P1 pole 96 and the shaping layer 120, such that magnetic flux can flow between them. A write pole probe layer 140 including a write pole tip 148 is next fabricated in magnetic flux communication with the shaping layer 120.

Figure 3:
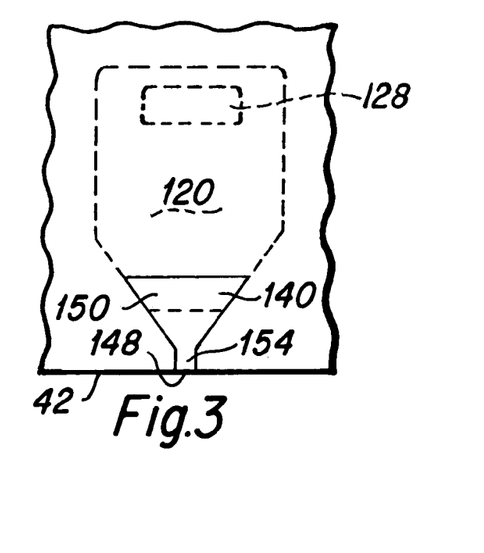
FIG. 3 is a top plan view depicting the shape of the probe layer of the magnetic head depicted in FIG. 2.
Figure 4:
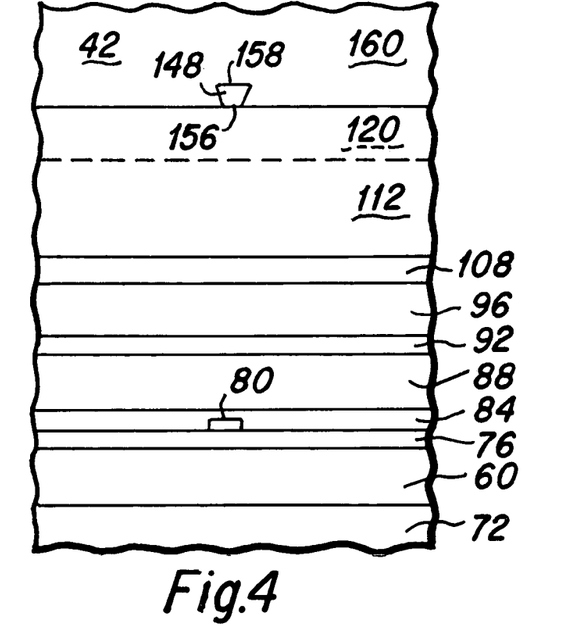
FIG. 4 is an elevational view taken from the air bearing surface of the magnetic head depicted in FIG. 2 taken along lines 4-4 of FIG. 2.

As can be seen in the top plan view of the probe layer presented in FIG. 3, the probe layer includes a wide yoke portion 150 which is fabricated on top of the shaping layer 120. The yoke 150 is tapered inwardly to a narrow neck portion 154 which extends to the ABS 42 to form the pole tip 148 of the magnetic head. FIG. 4 is a side elevational view taken from the ABS which depicts the preferred generally trapezoidal shape of the pole tip 148 as exposed at the ABS. When the magnetic head is installed in a hard disk drive, with respect to a rotating disk, the shorter edge 156 is the leading edge of the pole tip and the longer edge 158 is the trailing edge of the pole tip 148.

Following the fabrication of the probe layer 140, further magnetic head fabrication steps, such as the fabrication of electrical interconnects (not shown), are accomplished, as are well known to those skilled in the art, and the magnetic head is subsequently encapsulated, such as with the deposition of an alumina layer 160. Thereafter, the wafer is sliced into rows of magnetic heads, and the ABS surface 42 of the heads is carefully polished and lapped and the discrete magnetic heads 38 are ultimately formed.

As is well understood by those skilled in the art, electrical current flowing through the induction coil 104 will cause magnetic flux to flow through the magnetic poles of the head, where the direction of magnetic flux flow depends upon the direction of the electrical current through the induction coil.

For instance, current in one direction will cause magnetic flux to flow through the shaping layer 120 through the probe layer 140 to the narrow pole tip 148 into the high coercivity magnetic layer 50 of the hard disk 12. This magnetic flux causes magnetized data bits to be recorded in the high coercivity layer 50 as the disk moves past the magnetic head in direction 56, where the magnetization of the data bits is perpendicular to the surface 19 of the disk 12. It is of particular significance to the present invention that the trailing edge 158 of the pole tip 148 plays a substantial role in determining the shape and magnetic properties of the magnetic data bits that are formed within the disk, and FIGS. 5 and 6 are provided to illustrate this point.

Figure 5:
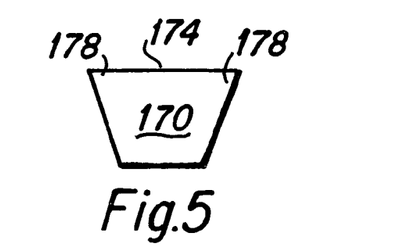
FIG. 5 is an elevational view depicting a desirable shape of a magnetic pole tip.
Figure 6:
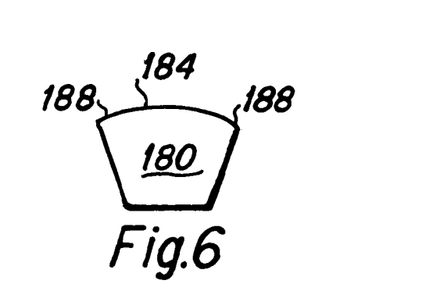
FIG. 6 is an elevational view depicting an undesirable shape of a magnetic pole tip.

FIG. 5 is an elevational view depicting a desirable pole tip 170 having a flat trailing edge 174 with well-defined, sharp corners 178, and FIG. 6 is an elevational view of an undesirable pole tip 180 having a non-flat trailing edge 184 with rounded corners 188. As mentioned hereabove, the trailing edge of the pole tip plays a substantial role in the formation of magnetic data bits within the hard disk media. It has been determined that the rounded corners 188 of the undesirable pole tip 180 of FIG. 6, negatively affect the shape of the magnetic data bits that are formed in the disk media. Conversely, the flat trailing edge 174 with sharp corners 178 of the desirable pole tip shape 170 of FIG. 5 create desirable well defined magnetic data bits within the disk media. It is therefore a goal and advantage of the present invention that a magnetic head 200 with a magnetic pole tip having a flat trailing edge with sharp, well-defined corners is produced, and the method for fabricating such a pole tip of the present invention is next described.

Figure 7:
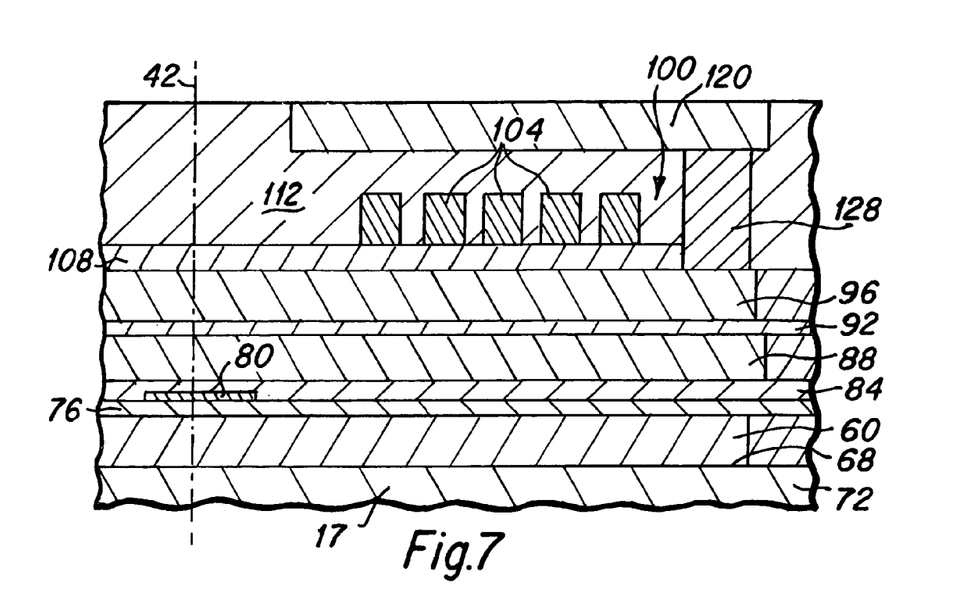
FIGS. 7-13 are cross-sectional views depicting sequential fabrication steps that are undertaken in fabricating the magnetic pole of the present invention.

FIG. 7 is a side cross-sectional view depicting a fabrication stage of a perpendicular magnetic head having components that are substantially similar to those depicted in the prior art magnetic head of FIG. 2, and such similar components are numbered identically for ease of comprehension. As depicted in the fabrication process step of FIG. 7, the perpendicular magnetic head includes a first magnetic shield layer (S1) 60 that is formed upon the upper surface 68 of the slider substrate 72. A first insulation layer (G1) 76 is formed on the S1 shield 60 and a read head sensor element 80 is formed on the G1 layer 76. A second insulation layer (G2) 84 is formed on the sensor 80 and a second magnetic shield layer (S2) 88 is formed upon the G2 insulation layer 84. An electrical insulation layer 92 is then deposited upon the S2 shield 88, and a first magnetic pole (P1) 96 is fabricated upon the insulation layer 92. An induction coil structure 100 is fabricated upon the P1 pole 96, that includes induction coil turns 104 that are typically formed upon an electrical insulation layer 108 and within filling insulation 112. A second magnetic pole layer 120, typically termed a shaping layer 120, is fabricated on top of the induction coil structure 100. A magnetic back gap piece 128 joins the back portions of the P1 pole 96 and the shaping layer 120, such that magnetic flux can flow between them. A polishing step is next conducted to provide a clean flat upper surface of the shaping layer for the fabrication of the probe layer with its magnetic pole tip thereon.

Figure 8:
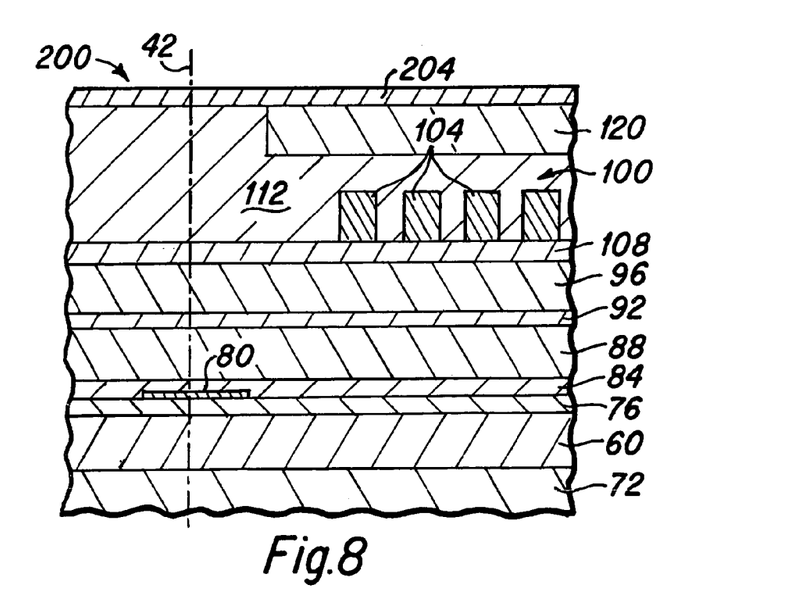
Figure 9:
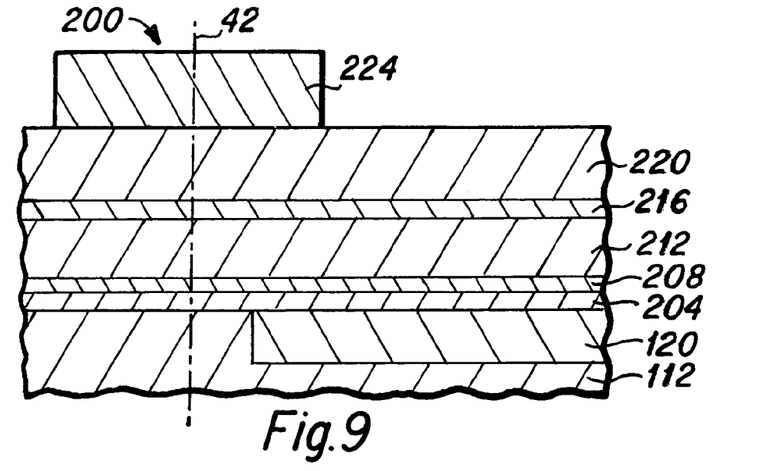
Figure 15:
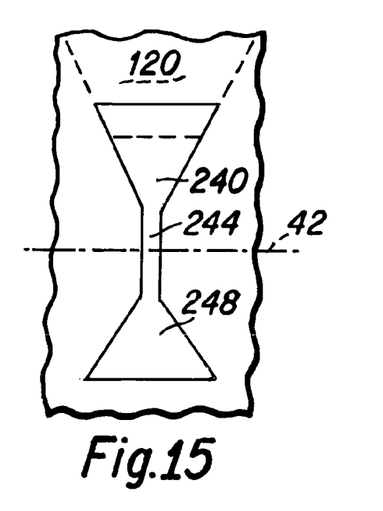
FIG. 15 is a top plan view of the fabrication step depicted in FIG. 13, taken along lines 15-15 of FIG. 13.

As is next depicted in FIG. 8, the probe layer material 204 is next deposited across the flat surface of the wafer including upon the shaping layer 120. The probe layer 204 may be comprised of a laminated structure having alternating magnetic and non-magnetic layers, or it can be comprised of other materials such as are known to those skilled in the art. Thereafter, as depicted in FIG. 9, layers of milling mask materials are fabricated upon the probe layer. The milling mask layers may include a first diamond-like-carbon (DLC) layer 208 having a thickness of approximately 10-20 nm, and a robust organic milling mask 212 layer such as Duramide, having a thickness of approximately 600-1200 nm. In a preferred embodiment, the milling mask structure may also include a layer of silicon dioxide (SiO$_2$) 216 having a thickness of approximately 80-120 nm and a second Duramide layer 220 having a thickness of approximately 40-80 nm. Thereafter, a layer of photoresist 224 is applied across the wafer and subsequently patterned utilizing well known photolithographic techniques, such that the remaining photoresist is shaped in the pattern of the desired final probe layer with the desired pole tip width, which is depicted in FIG. 15, and described herebelow.

Figure 10:
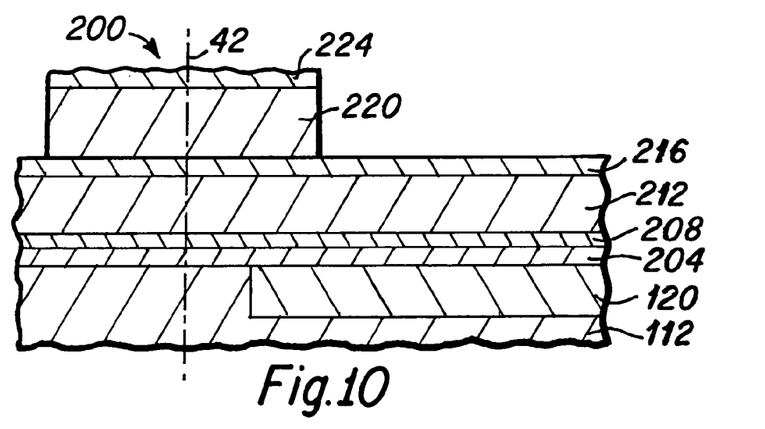
Figure 11:
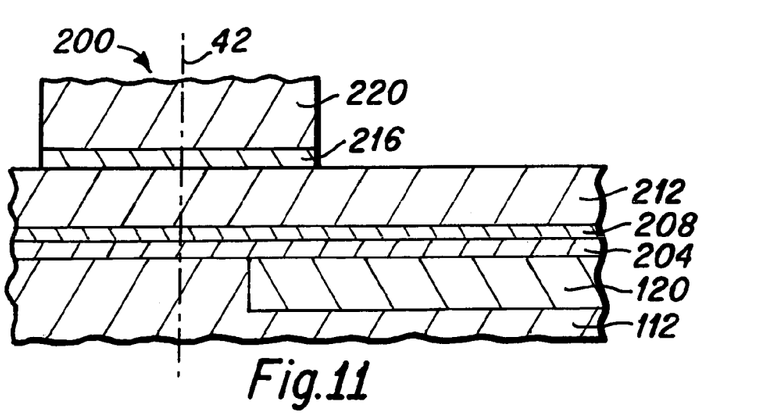
Figure 12:
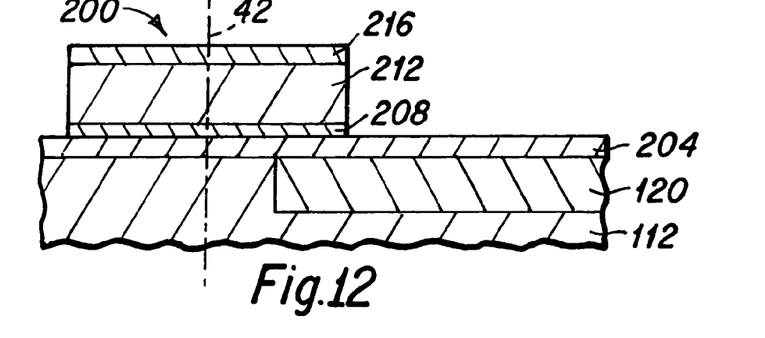
Figure 13:
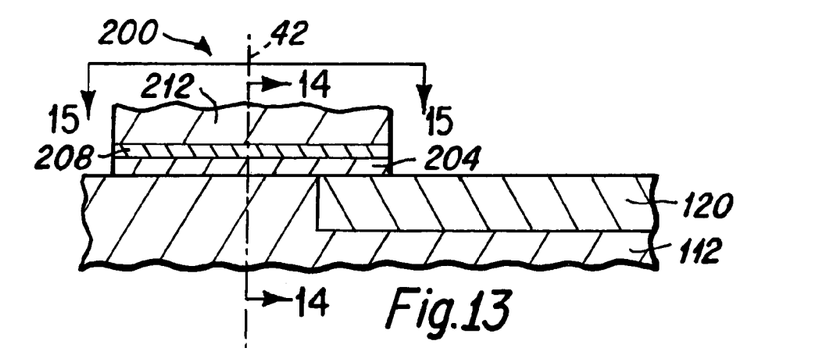

Thereafter, as is depicted in FIGS. 10-15, one or more reactive ion etching (RIE) steps are conducted in which the upper photoresist mask 224 serves to protect and shape the milling mask layers below it. As depicted in FIG. 10, a first RIE step, utilizing a reactive ion species such as oxygen, is undertaken to shape and remove the unmasked portions of the second organic Duramide layer 220. Then a second RIE step (see FIG. 11), utilizing a reactive species such as fluorine, is conducted to remove the unmasked SiO$_2$ layer 216 if present. Thereafter, as depicted in FIG. 12, a further RIE step using oxygen reactive species is conducted to remove the remaining unmasked portions of the first Duramide layer 212 and the unmasked portion of the first DLC layer 208.

A standard ion milling step using a species such as argon is next employed to remove the unmasked probe layer material 204 from the surface of the wafer. Most, though not all, of the remaining masking materials are also removed in this ion milling step. Thereafter, as is seen in the cross-sectional view of FIG. 13, the remaining masked probe layer 204 will include the first DLC layer 208 and a portion of the first Duramide mask material 212 thereupon. In the cross-sectional view of FIG. 14, it is seen that the trapezoidal shape of the pole tip 228 has been created; this is accomplished by use of multi-directional argon ion milling angles to remove the lower side edge portions 230 of the masked pole tip 228. In the top view presented in FIG. 15, it is seen that the shape of the probe layer 204 at this fabrication stage is somewhat like an hourglass, having a relatively broad yoke portion 240 that is fabricated upon the shaping layer 120, a narrow pole tip portion 244 and a relatively broad anchor portion 248. It can be seen that the air bearing surface 42 will ultimately be formed in the narrow pole tip portion 244, whereupon the anchor portion 248 will be discarded. However, during the head fabrication, the anchor portion 248 serves to provide mechanical stability to the narrow pole tip portion 244 of the probe layer 204.

Figure 14:
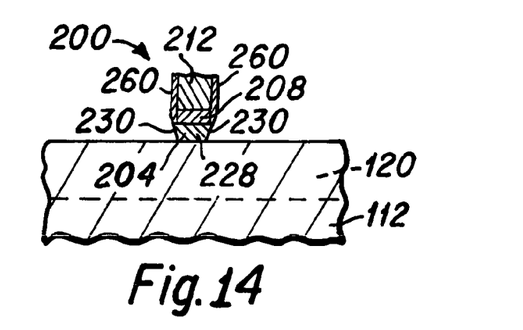
FIG. 14 is a cross-sectional view of the fabrication step depicted in FIG. 13, taken along lines 14-14 of FIG. 13.

It is now necessary to remove the remaining portion of the first Duramide layer 212 and first DLC layer 208 that remain on top of the probe layer 204 as seen in FIG. 14. Additionally, the probe layer ion milling step will generally result in the undesirable redeposition of probe layer material 260, termed fences, upon the sides of the remaining Duramide mask material 212 and these fences 260 must also be removed. Various methods have been attempted to remove these unwanted masking materials and fences, such as wet chemical stripping, snow and air blowing and polishing. However none of these methods has proven to be successful in the manufacturing setting; that is, creating reliable results from wafer to wafer, or even with sufficient repeatability across the surface of a single wafer. The present invention provides a method for successfully and repeatably removing the remaining milling mask materials 208 and 212 from the surface of the probe layer 204, including the delicate narrow portion 244 which forms the pole tip 228.

Figure 16:
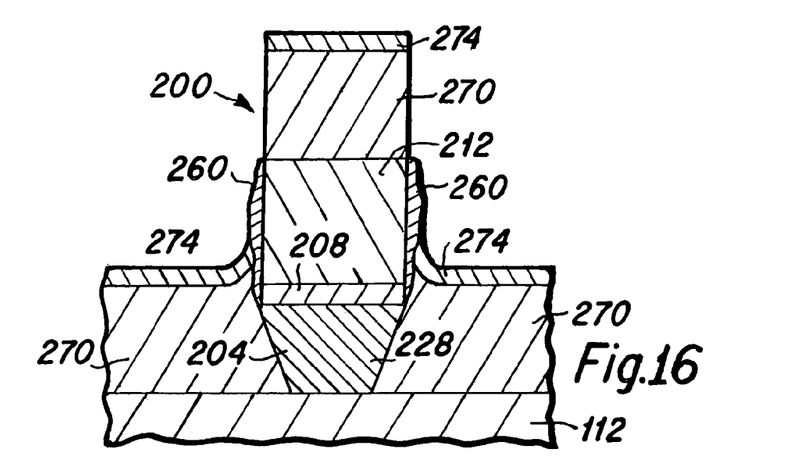
FIGS. 16-19 are cross-sectional views taken from the direction of FIG. 14, depicting further fabrication steps of the magnetic pole of the present invention.

As is next depicted in the cross-sectional view of FIG. 16, a fill material 270, such as alumina, is deposited across the surface of the wafer in a controlled depth that is slightly greater than the thickness of the probe layer 204. It is desirable that the thickness of the probe layer 204 be measured prior to the deposition of the fill material 270, and that the fill material be deposited to a thickness of from 100 Å to 300 Å and preferably approximately 200 Å greater than the thickness of the probe layer. As depicted in FIG. 16, the fill material 270 may tend to bank up at the sides of the masking material. Thereafter, a second DLC layer 274, having a thickness of approximately 10-20 nm, is deposited upon the fill material 270 across the surface of the wafer.

Figure 17:
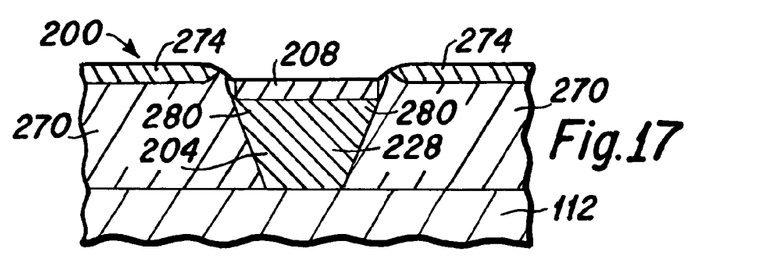

A very mild chemical mechanical polishing (CMP) liftoff step is next undertaken to remove the remaining milling mask material 212 and fences 260 (see FIG. 17). The CMP liftoff step preferably includes very small abrasive particulates, a mild pH slurry and a very low polishing pressure, the details of which are described herebelow. The gentle CMP liftoff process provides sufficient chemical and mechanical force to break off the remaining first Duramide milling mask materials 212 and fences 260 proximate the upper surface of the first DLC layer 208 while the second DLC layer 274 provides a hard surface that protects the fill material 270 from removal by the CMP process. For the CMP liftoff process to function properly, the remaining thickness of the remaining first Duramide mask material 212 prior to the CMP liftoff steps should be at least 100 nm, and preferably approximately 200 nm. As depicted in FIG. 17, the CMP liftoff step results in the removal of the remaining milling mask material 212 and fences 260, such that the upper surfaces of the first DLC layer 208 and second DLC layer 274 are exposed. The CMP liftoff step is not intended to planarize the wafer surface, but rather to liftoff the remaining first Duramide mask material and fences above the first DLC layer 208. It can be seen that the thickness of the fill layer 270 is sufficient to provide good protection for the corners 280 of the pole tip 228 from unwanted polishing during the CMP liftoff step.

In order to achieve complete CMP liftoff and maintain the integrity of the pole shape it is important to use an appropriate type of CMP slurry and a set of mild polishing conditions. Mildly alkaline pH slurries (pH from approximately 9 to 11 and preferably approximately 10) with silica or alumina abrasive particles having a mean particle size of from approximately 0.02 to 0.15 um and preferably approximately 0.05 um or less are desirable for this application. Hard polishing pads such as polyurethane-based pads are preferably used to avoid aggressive deformation of the pad and damage to the pole surface. In addition, the polishing pressure should be kept in a range of approximately 2 psi to 4 psi and preferably approximately 3 psi or lower to avoid aggressive polishing of the dielectric/alumina and the possibility of damaging the pole; the material removal rate with these conditions is approximately 200 Å to 400 Å. per minute.

Figure 18:
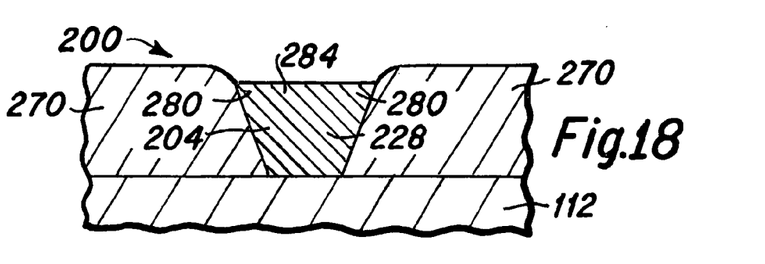

After the CMP liftoff step, a reactive ion etch step is next conducted utilizing oxygen reactive ion species to remove the first and second DLC layers, 208 and 274 respectively. As depicted in FIG. 18, upon the removal of the first and second DLC layers, sufficient fill material 270 remains proximate the pole to protect the pole tip corners 280 and flat trailing edge 284 during the subsequent standard magnetic head fabrication steps. Because the thickness of the fill material 270 is greater than the thickness of the magnetic pole tip 228, but not excessively thicker, the magnetic pole tip 228 retains its flat trailing edge surface and sharp, well-defined corners 280.

Figure 19:
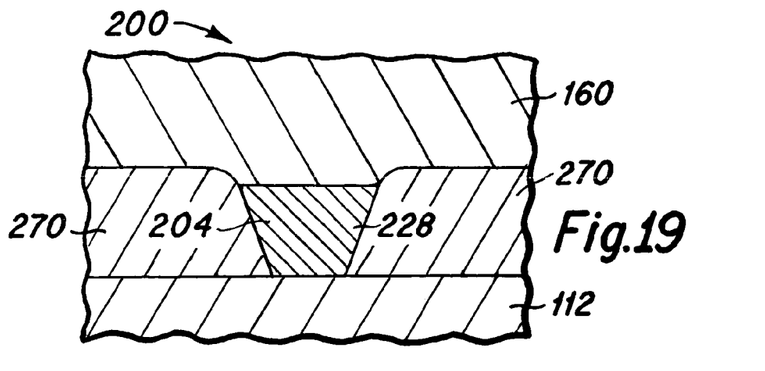

Thereafter, as depicted in FIG. 19, a further fill material 160, such as alumina, is subsequently deposited to encapsulate the pole tip 228 and probe layer 204 of which it is a part.

This encapsulation step has been described hereabove with regard to FIG. 2.

Figure 20:
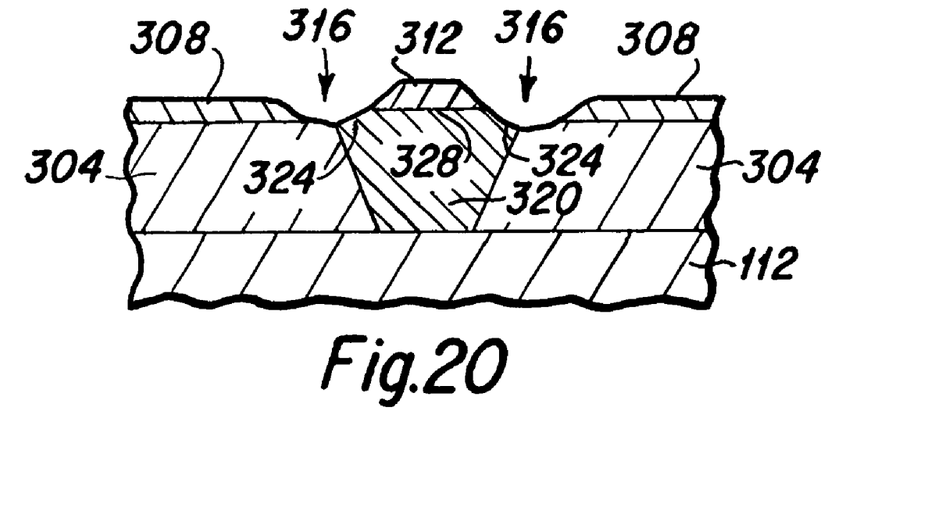
FIGS. 20 and 21 are cross-sectional views depicting undesirable fabrication step conditions which the present invention seeks to avoid.
Figure 21:
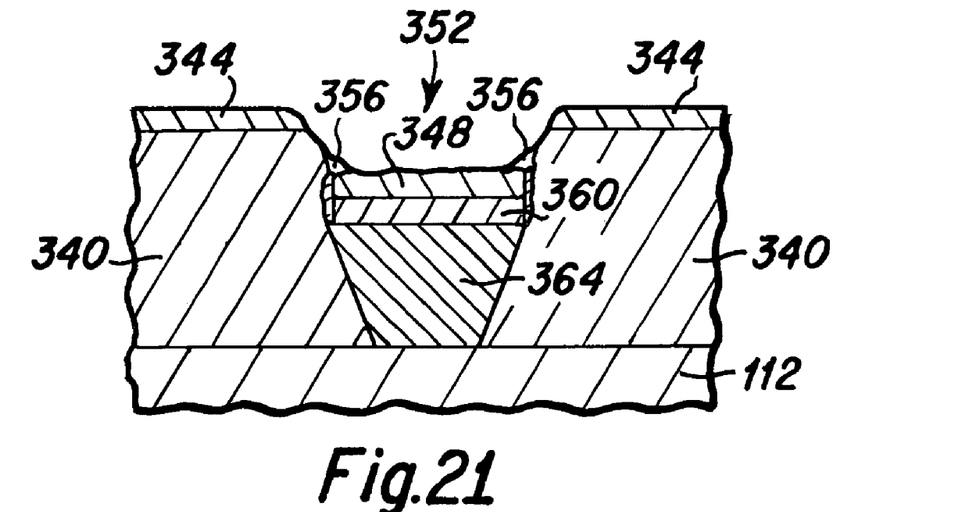

As indicated hereabove, accurate measurement and control of the thickness of the fill material 270 is important in achieving the results of the present invention. Specifically, FIGS. 20 and 21 are provided to explain the unacceptable results which are obtained from a fill layer that is too thin and (FIG. 20) and a fill layer that is too thick (FIG. 21). Initially, as depicted in FIG. 20, where a fill layer 304 is too thin, a second DLC layer 308 can be at or below the level of a first DLC layer 312. In this case, the polishing action of the CMP step, even the gentle CMP step of the present invention, results in dishing down 316 to remove fill material and some of the first DLC layer 312 at the edges of the pole tip 320. This results in unwanted rounding of the pole tip corners 324 at the trailing edge 328 of the pole tip, which has been described hereabove to lead to less than optimal magnetic data bit formation. With regard to a fill material layer 340 that is too thick, as depicted in FIG. 21, it is seen that a relatively high second DLC layer 344 that is formed upon the overly thick fill layer 340 can act to prevent clean removal of all of the first Duramide mask material 348. Additionally, following the polishing step, polishing debris and the like 356 can become resident in the depressed area 352 above the pole tip. The subsequent RIE step which is utilized to remove the first DLC layer 360 from the pole tip 364 can be inhibited by the foreign material 356 that resides within the opening. Removal of this material 348 and 356 poses additional problems which it is unnecessary to encounter where the thickness of the material fill layer is properly and accurately deposited as is described above.

As set forth in detail above, the present invention includes a manufacturable method for removing mask overburden and re-deposition fence materials after the probe layer ion milling for wafer level fabrication of the write pole of perpendicular magnetic heads. It includes a CMP assisted liftoff process, with significant parameters that include the thickness of the resist/organic mask materials desired on the pole after ion milling for effective CMP assisted liftoff, the thickness of the dielectric fill material needed to protect the write pole during the CMP liftoff step, and the type of CMP slurry, polishing pad and polishing conditions necessary to yield satisfactory results.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

We claim:

1. A method for fabricating a magnetic head, comprising:
    depositing a layer of magnetic pole material upon a surface of non-magnetic material;
    depositing a first diamond-like-carbon (DLC) layer upon said magnetic pole material layer;
    fabricating a milling mask for a magnetic pole upon said first DLC layer, wherein said milling mask further includes a first layer of organic material, a silicon dioxide layer, a second layer of organic material and a photoresist layer;
    milling said magnetic pole material layer to remove unmasked magnetic pole material;
    depositing a fill material to a thickness that is greater than a thickness of said magnetic pole material layer;
    performing a CMP liftoff step to remove remaining milling mask material from remaining portions of said magnetic pole material;
    depositing further fill material upon said remaining portions of said magnetic pole material.

2. The method for fabricating a magnetic head as described in claim 1 wherein said thickness of said fill material is approximately 100 Å to 200 Å greater than said thickness of said magnetic pole material layer.

3. The method for fabricating a magnetic head as described in claim 2 wherein a second DLC layer is deposited upon said fill material prior to said CMP liftoff step.

4. The method for fabricating a magnetic head as described in claim 3 wherein said second DLC layer is formed with a thickness of approximately 10 nm to 20 nm.

5. The method for fabricating a magnetic head as described in claim 1 wherein said remaining milling mask material has a thickness of at least 100 nm.

6. The method for fabricating a magnetic head as described in claim 1 wherein said CMP liftoff step is performed with a CMP slurry having a pH of approximately 9-11.

7. The method for fabricating a magnetic head as described in claim 1 wherein said CMP liftoff step is performed with a CMP slurry including abrasive particles having a size in the range of approximately 0.02 to 0.15 microns.

8. The method for fabricating a magnetic head as described in claim 1 wherein said CMP liftoff step is performed with a polishing pressure of approximately 2-4 psi.

9. The method for fabricating a magnetic head as described in claim 1 wherein said CMP liftoff step is performed with a polishing pressure in the range of approximately 2-4 psi, and wherein said CMP liftoff step is performed with a CMP slurry including abrasive particles having a size in the range of approximately 0.02 to 0.15 microns and a pH of approximately 9-11.

10. The method for fabricating a magnetic head as described in claim 1 wherein said first DLC layer is formed with a thickness of approximately 10 to 20 nm, said first organic material layer is formed with a thickness of approximately 600 to 1200 nm, said $SiO_2$ layer is formed with a thickness of approximately 80 to 120 nm, and said second organic material layer is formed with a thickness of approximately 40 to 80 nm.

11. The method for fabricating a magnetic head as described in claim 1 wherein said step of fabricating said milling mask includes:
    performing a first reactive ion etch (RIE) step using oxygen reactive species to remove unmasked portions of said second organic material layer;
    performing a second RIE step using fluorine reactive species to remove unmasked portions of said $SiO_2$ layer; and
    performing a third RIE step using oxygen reactive species to remove unmasked portions of said first organic material layer and said first DLC layer.

12. The method for fabricating a magnetic head as described in claim 1 wherein said first layer of organic material is comprised of Duramide and said second layer of organic material is comprised of Duramide.

13. A method for fabricating a magnetic head, comprising:
    depositing a layer of magnetic pole material upon a surface of non-magnetic material;
    depositing a first diamond-like-carbon (DLC) layer upon said magnetic pole material layer;
    fabricating a milling mask for a magnetic pole upon said first DLC layer, wherein said milling mask further includes a first layer of organic material, a silicon dioxide layer, a second layer of organic material and a photoresist layer;

milling said magnetic pole material layer to remove unmasked magnetic pole material, wherein remaining milling mask material has a thickness of at least 100 nm;

depositing a fill material to a thickness that is 100 Å to 200 Å greater than a thickness of said magnetic pole material layer;

depositing a second DLC layer upon said fill material;

performing a CMP liftoff step to remove said remaining milling mask material from remaining portions of said magnetic pole material;

depositing further fill material upon said remaining portions of said magnetic pole material.

14. The method for fabricating a magnetic head as described in claim 13 wherein said CMP liftoff step is performed with a polishing pressure in the range of approximately 2-4 psi, and wherein said CMP liftoff step is performed with a CMP slurry including abrasive particles having a size in the range of approximately 0.02 to 0.15 microns and a pH of approximately 9-11.

15. The method for fabricating a magnetic head as described in claim 13 wherein said first DLC layer is formed with a thickness of approximately 10 to 20 nm, said first organic material layer is formed with a thickness of approximately 600 to 1200 nm, said $SiO_2$ layer is formed with a thickness of approximately 80 to 120 nm, and said second organic material layer is formed with a thickness of approximately 40 to 80 nm.

16. The method for fabricating a magnetic head as described in claim 13 wherein said step of fabricating said milling mask includes:

performing a first reactive ion etch (RIE) step using oxygen reactive species to remove unmasked portions of said second organic material layer;

performing a second RIE step using fluorine reactive species to remove unmasked portions of said $SiO_2$ layer; and performing a third RIE step using oxygen reactive species to remove unmasked portions of said first organic material layer and said first DLC layer.

17. The method for fabricating a magnetic head as described in claim 13 wherein said first layer of organic material is comprised of Duramide and said second layer of organic material is comprised of Duramide.

18. The method for fabricating a magnetic head as described in claim 13 wherein said second DLC layer is formed with a thickness of approximately 10 to 20 nm.

* * * * *